US012106531B2

(12) United States Patent
Wang et al.

(10) Patent No.: US 12,106,531 B2
(45) Date of Patent: Oct. 1, 2024

(54) FOCUSED COMPUTER DETECTION OF OBJECTS IN IMAGES

(71) Applicant: Microsoft Technology Licensing, LLC, Redmond, WA (US)

(72) Inventors: Lijuan Wang, Bellevue, WA (US); Zicheng Liu, Bellevue, WA (US); Ying Jin, Kirkland, WA (US); Hongli Deng, Bellevue, WA (US); Kun Luo, Redmond, WA (US); Pei Yu, Bellevue, WA (US); Yinpeng Chen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 17/383,362

(22) Filed: Jul. 22, 2021

(65) Prior Publication Data
US 2023/0036402 A1 Feb. 2, 2023

(51) Int. Cl.
*G06V 40/10* (2022.01)
*G06T 7/70* (2017.01)
*G06V 10/22* (2022.01)

(52) U.S. Cl.
CPC ............... *G06V 10/22* (2022.01); *G06T 7/70* (2017.01); *G06V 40/10* (2022.01); *G06T 2207/30196* (2013.01)

(58) Field of Classification Search
CPC .......... G06V 10/22; G06V 40/10; G06T 7/70; G06T 2207/30196
See application file for complete search history.

(56) References Cited

U.S. PATENT DOCUMENTS

| 2004/0165754 A1* | 8/2004 | Tabata ................. G06V 40/161 |
| | | 382/118 |
| 2020/0272812 A1* | 8/2020 | Wang ......................... G06T 7/11 |

(Continued)

FOREIGN PATENT DOCUMENTS

| CN | 109086717 A | 12/2018 |
| CN | 109218667 A | 1/2019 |

(Continued)

OTHER PUBLICATIONS

Song et al. "An end-to-end spatio-temporal attention model for human action recognition from skeleton data." Proceedings of the AAAI conference on artificial intelligence. (Year: 2017).*

(Continued)

*Primary Examiner* — Shaghayegh Azima
(74) *Attorney, Agent, or Firm* — Alleman Hall & Tuttle LLP

(57) ABSTRACT

To improve the accuracy and efficiency of object detection through computer digital image analysis, the detection of some objects can inform the sub-portion of the digital image to which subsequent computer digital image analysis is directed to detect other objects. In such a manner object detection can be made more efficient by limiting the image area of a digital image that is analyzed. Such efficiencies can represent both computational efficiencies and communicational efficiencies arising due to the smaller quantity of digital image data that is analyzed. Additionally, the detection of some objects can render the detection of other objects more accurate by adjusting confidence thresholds based on the detection of those related objects. Relationships between objects can be utilized to inform both the image area on which subsequent object detection is performed and the confidence level of such subsequent object detection.

17 Claims, 10 Drawing Sheets

(56) References Cited

U.S. PATENT DOCUMENTS

| | | | | |
|---|---|---|---|---|
| 2020/0272888 | A1* | 8/2020 | Wang | G06V 40/103 |
| 2021/0070306 | A1* | 3/2021 | Yamauchi | B60W 50/14 |
| 2021/0097408 | A1* | 4/2021 | Sicconi | G06N 20/00 |
| 2021/0110557 | A1* | 4/2021 | Busey | G06T 19/006 |
| 2021/0334564 | A1* | 10/2021 | Park | G06F 18/24 |
| 2022/0076040 | A1* | 3/2022 | Delahaye | B60W 40/08 |
| 2022/0253988 | A1* | 8/2022 | Miles | G06T 3/12 |

FOREIGN PATENT DOCUMENTS

| | | | | |
|---|---|---|---|---|
| CN | 109614882 A | | 4/2019 | |
| CN | 110363131 A | | 10/2019 | |
| CN | 112101094 A | | 12/2020 | |
| CN | 112101098 A | | 12/2020 | |
| CN | 112818839 A | * | 5/2021 | |
| CN | 113011290 A | * | 6/2021 | G06K 9/00711 |
| WO | 2021051547 A1 | | 3/2021 | |
| WO | WO-2021140590 A1 | * | 7/2021 | G06V 10/25 |
| WO | WO-2022264195 A1 | * | 12/2022 | |

OTHER PUBLICATIONS

Fang, Hao-Shu, et al. "Pairwise body-part attention for recognizing human-object interactions"; Proceedings of the European conference on computer vision (ECCV) (Year: 2018).*

Fang et al.; "Pairwise body-part attention for recognizing human-object interactions"; Proceedings of the European conference on computer vision (ECCV). (Year: 2018).*

"Make your World Safer and Smarter", Retrieved From: https://web.archive.org/web/20210322163528/https:/www.trueface.ai/, Mar. 22, 2021, 5 Pages.

Dever, et al., "Automatic Visual Recognition of Armed Robbery", In Proceedings of 16th International Conference on Pattern Recognition, Aug. 11, 2002, pp. 451-455.

Fang, et al., "Pairwise Body-Part Attention for Recognizing Human-Object Interactions", In Repository of arXiv:1807.10889v1, Jul. 28, 2018, 18 Pages.

"International Search Report and Written Opinion Issued in PCT Application No. PCT/US22/032588", Mailed Date: Sep. 23, 2022, 11 Pages.

* cited by examiner

FOCUSED COMPUTER DETECTION OF OBJECTS IN IMAGES

BACKGROUND

Computer digital image analysis is often utilized to detect aspects of a physical scene represented by the digital image, typically within the context of object detection. For example, a digital camera can obtain digital images of products as they pass along a conveyor belt in an assembly line. One or more computing devices can then perform computer digital image analysis of the obtained digital images to detect defects in the products. For example, the computer digital image analysis can identify misshapen parts, foreign objects, or other like object identification. As another example, a digital security camera can obtain digital images of a physical scene, such as of a physical location on which the camera is trained. One or more computing devices can then perform computer digital image analysis of the obtained digital images to detect objects of interest. For example, the computer digital image analysis can identify weapons, such as guns, knives, or other like objects that may be deemed to be a threat. As another example, the computer digital image analysis can identify objects of interest, such as, for example, lit cigarettes, which may be of substantial interest if the physical location on which the camera is trained is a fireworks store.

Traditionally, computer digital image analysis was performed by comparing the pixels of the digital image to pixels that were known to represent an object of interest that was to be detected in the digital image analysis. For example, if the digital image analysis was being performed on digital images of products on an assembly line, then pixels representing a properly formed product could be compared to pixels from the captured digital images to determine whether the products pictured in those digital images were properly formed and/or manufactured. In such a manner, defects could be detected.

More recently, computer neural network technology is utilized to provide more flexibility and accuracy to computer digital image analysis. More specifically, computer neural networks are trained with a training set of images, such as of images that can both picture the object of interest as well as images that do not picture the object of interest, and, in such a manner, can enable the neural networks to establish weight values that, in aggregate, when utilized within the neural network, are able to distinguish between images that show an object of interest, and images that do not.

Computer digital image analysis, however, remains computationally expensive and inaccurate. For example, computer digital image analysis of individual frames of a digital video can require the analysis of hundreds of megabytes, or even gigabytes, of data within a short span of time. If computer digital image analysis is utilized to detect objects in real time, such analysis must be performed quickly in order to provide real-time object detection, thereby necessitating large, power consuming computing devices that are expensive to purchase and maintain. Analogously, object detection requires computer digital image analysis of the entire frame of the digital image. Such analysis can result in inaccurate object detection that can be due to poor lighting, distortion at the edges of the frame, or other like suboptimalities in the digital image data.

SUMMARY

To improve the accuracy and efficiency of object detection through computer digital image analysis, the detection of some objects can inform the sub-portion of the digital image to which subsequent computer digital image analysis is directed to detect other objects. In such a manner object detection can be made more efficient by limiting the image area of a digital image that is analyzed. Such efficiencies can represent both computational efficiencies and communicational efficiencies arising due to the smaller quantity of digital image data that is analyzed. Additionally, the detection of some objects can render the detection of other objects more accurate by adjusting confidence thresholds based on the detection of those related objects. Relationships between objects can be utilized to inform both the image area on which subsequent object detection is performed and the confidence level of such subsequent object detection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the detection of objects in a digital image by a computing device performing computer digital image analysis. To improve the accuracy and efficiency of object detection through computer digital image analysis, the detection of some objects can inform the sub-portion of the digital image to which subsequent computer digital image analysis is directed to detect other objects. In such a manner object detection can be made more efficient by limiting the image area of a digital image that is analyzed. Such efficiencies can represent both computational efficiencies and communicational efficiencies arising due to the smaller quantity of digital image data that is analyzed. Additionally, the detection of some objects can render the detection of other objects more accurate by adjusting confidence thresholds based on the detection of those related objects. Relationships between objects can be utilized to inform both the image area on which subsequent object detection is performed and the confidence level of such subsequent object detection.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
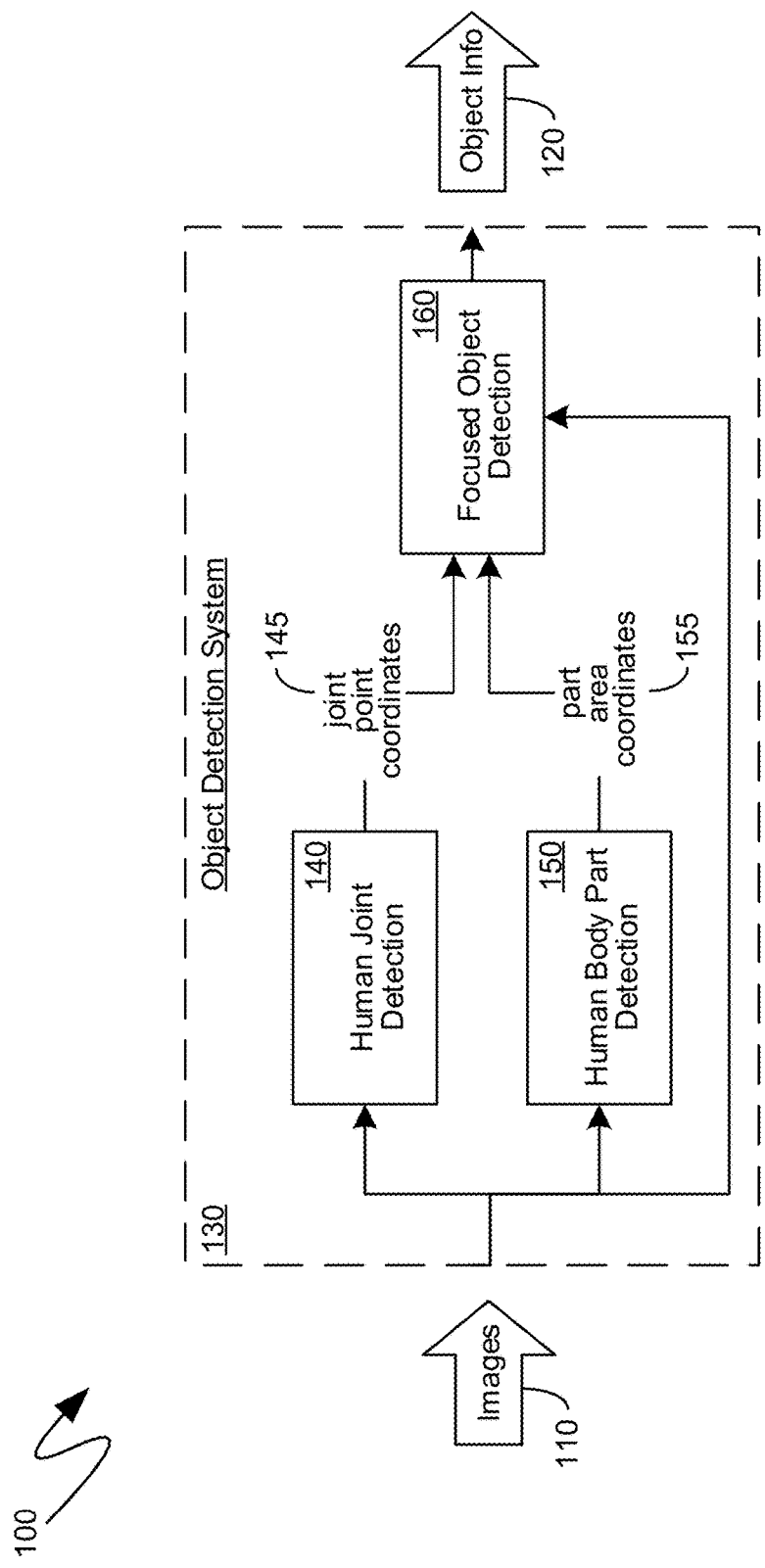
FIG. 1 is a system diagram of an example of focused computer detection of objects in images.

With reference to FIG. 1, an exemplary system 100 is illustrated, providing context for the descriptions below. In the exemplary system 100, digital images, such as the exemplary digital images 110, can be provided as input to an object detection system, such as the exemplary object detection system 130. The digital images 110 can be individual still images, or can be frames of a digital video input. Accordingly, as utilized herein, the term "digital image" means image data of a singular image, whether a still image or a frame of a video, that has a defined boundary, or "frame", and within that frame is divided into discrete quanta, or "pixels", where each pixel comprises one or more values, expressed in binary form, with such values represents aspects of the image, such as values of individual base colors that are combined to achieve the color of the pixel, or other like pixel-specific image metadata. The digital images 110 are of a physical scene, where the term "physical scene", as utilized herein, means the physical area of the physical realm whose likeness is represented within the images, and on which is trained the imaging device or apparatus that captures the digital images 110. For example, the physical scene can be the inside of a store being imaged by a digital security video camera. As another example, the physical scene can be a portion of a conveyor belt being imaged by a manufacturing equipment camera. As yet another example, the physical scene can be an area outside of the building being imaged by a digital security video camera.

According to one aspect, the exemplary object detection system 130 can incorporate existing, or already-implemented, object detection systems to detect preliminary objects within the digital images 110. The detection of an object of interest, such as by the exemplary focused object detection system 160, can then be informed by the existing object detection systems, including being "focused" on a specific portion of the images 110. The utilization of existing object detection systems can then minimize the data that is processed by the focused object detection system 160, increasing its speed and efficiency. Additionally, the utilization of existing object detection systems can further inform the focused object detection system 160, thereby increasing its accuracy.

For example, one existing object detection system can be a human joint detection system, such as the exemplary human joint detection system 140. The detection of human joints, such as an elbow joint, a knee joint, a hip joint, a shoulder joint, and neck joint, or other like human joints can be utilized to limit the focused object detection system 160 to specific areas of the images 110, given known relationships between humans and the object to be detected by the focused object detection system 160. For example, if the object to be detected by the focused object detection system 160 is typically carried by human in their hand, information regarding the location of an elbow joint, or even a shoulder joint, within the frame of the digital image, can target a specific portion of the digital image where such an object would likely be imaged, and, accordingly, the focused object detection system 160 can perform digital image analysis on such a portion. Exemplary mechanisms for generating joint coordinate information from image input are described in co-pending U.S. patent application Ser. No. 16/396,513, filed on Apr. 26, 2019, and published on Aug. 27, 2020 as United States Patent Application Publication Number 2020/0272888, entitled "NEURAL NETWORK FOR SKELETONS FROM INPUT IMAGES", the disclosures of which are herein incorporated by reference in their entirety for all that they teach and/or disclose, without limitation to the current, specific context within which such incorporation by reference is made.

The exemplary human joint detection system 140 can receive the images 110 as input and can output one or more coordinate values, nominated the "joint point coordinates" 145 in the exemplary system 100 of FIG. 1. As utilized herein, the term "coordinates" means an identification of a specific pixel, or other like identification of a specific point within the frame of a digital image. Typically, the coordinates would be provided in the form of an ordered pair representing a quantity of pixels in both height and width, respectively, that separate an identified point from an origin point. Within the specific context of the exemplary human joint detection system 140, the joint point coordinates 145 can include sets of coordinates that can comprise one or more coordinates for each of one or more joints. More specifically, the joint point coordinates 145 can identify specific points, pixels, or other like delineations of areas within the digital image, within which is imaged the corresponding, identified joint as it physically existed within the three-dimensional physical scene imaged by the image. As such, the individual human joints that are imaged in the images 110 are delineated by the coordinates of the joint point coordinates 145.

For example, the joint point coordinates 145 can comprise coordinates of a point, within a digital image, at which a specific joint, such as an elbow joint, was identified. Alternatively, or in addition, the joint point coordinates 145 can comprise coordinate values identifying an area, within the digital image, at which a specific joint is identified. For example, the joint point coordinates 145 can defined in area by identifying a central point and then further identifying a range, such as a distance in pixels, away from a central point. As another example, the joint point coordinates 145 can define an area by specifying the boundaries of the area in a sequence of coordinate values. Additionally, the joint point coordinates 145 can comprise information identifying specific joints and/or linking such identification of specific joints with specific coordinate values. For example, the joint point coordinates can identify that a first set of coordinate values corresponds to a location of a right elbow joint of an individual human pictured within the image, that a second set of coordinate values corresponds to a location of a left knee joint of the same individual, and so on. Identifiers can be assigned to detected individual humans and can be included within the joint point coordinates 145 so that, for example, the right elbow joint of one human can be distinguished from the right elbow joint of a different human. Alternatively, or in addition, the joint point coordinates 145 can be provided within a data structure where such identifiers can be explicitly or implicitly delineated.

According to one aspect, the exemplary object detection system 130 can comprise multiple systems that can detect multiple different types of preliminary objects within the digital images 110, with the information being provided by such multiple systems being utilized either alternatively or additively. Thus, for example, the exemplary object detection system 130 shown in FIG. 1 is illustrated as comprising both a human joint detection system 140, such as that detailed above, and also a human body part detection system, such as the exemplary human body part detection system 150. The images 110 input to the object detection system 130 can be provided to both the human joint detection system 140 and the human body part detection system 150.

Additionally, while illustrated as operating in parallel, and providing input to the focused object detection 160 in parallel, the preliminary object detection systems, such as the exemplary human joint detection system 140 and/or the human body part detection system 150 can operate in series, or can operate iteratively with each providing output to the other, which it output is then utilized as input to further refine the detection mechanisms of those systems. Thus, for example, the human joint detection system 140 could provide the joint point coordinates 145 to both the focused object detection system 160 and the human body part detection system 150. The human body part detection system 150 could then receive, as input, not only the images 110, but also the joint point coordinates 145, and based on the information from the joint point coordinates 145, the human body part detection system 150 could generate more accurate part area coordinates, such as the exemplary part area coordinates 155, which will be detailed further below. Furthermore, while illustrated as separate systems, the exemplary human joint detection system 140 in the exemplary human body part detection system 150 could be part of a single system that could detect both human joints and human body parts simultaneously, such as by utilizing a neural network that was trained to detect both simultaneously. Exemplary mechanisms for generating body part boundary information, such as that contained in the part area coordinates 155, from image input are described in co-pending U.S. patent application Ser. No. 16/281,876, filed on Feb. 21, 2019, and published on Aug. 27, 2020 as United States Patent Application Publication Number 2020/0272812, entitled "HUMAN BODY PART SEGMENTATION WITH REAL AND SYNTHETIC IMAGES", the disclosures of which are herein incorporated by reference in their entirety for all that they teach and/or disclose, without limitation to the current, specific context within which such incorporation by reference is made.

The coordinates output by the exemplary human body part detection system 150, such as the exemplary part area coordinates 155, can comprise an identification of an area, within an image, where an identified human body part has been detected. For example, the exemplary part area coordinates 155 can comprise coordinate boundary information, such as by identifying endpoints of a contiguous sequence of lines that, in aggregate, define a bounded area within an image. As another example, the exemplary part area coordinates 155 can comprise coordinate boundary information in the form of a sequence of coordinates defining one end of an area within the image, together with distance information, such as a quantity of pixels, defining how far the area extends from the defined end. As such, individual human body parts pictured within the image are delineated by the set of coordinates associated with such individual human body parts.

As with the joint point coordinates 145, the exemplary part area coordinates 155 can comprise information identifying specific body parts and/or linking such identification of specific body parts with specific coordinate values and/or defined areas. For example, the joint point coordinates can identify that a first set of coordinate values corresponds to a location of a torso of an individual human pictured within the image, that a second set of coordinate values corresponds to a location of a right arm of the same individual, and so on. As detailed above, identifiers can be assigned to detected individual humans and can be included within the part area coordinates 155. Alternatively, or in addition, the part area coordinates 155 can be provided within a data structure where such identifiers can be explicitly or implicitly delineated.

As illustrated in the exemplary object detection system 130, the detection of preceding objects, such as performed by the exemplary human joint detection system 140 and/or the exemplary human body part action system 150, can generate input, such as the exemplary joint point coordinates 145 and/or the exemplary part area coordinates 155, respectively, which can be provided as input to a focused object detection system, such as the exemplary focused object detection system 160. In addition, the exemplary focused object detection system 160 can receive as input the digital images 110, or at least portions thereof. The focused object detection system 160 can then detect objects, such as will be detailed below, within the images 110, and can output information, such as the exemplary object information 120, identifying the detected objects. For example, the object information 120 can comprise an indicator of whether or not a specific object was detected. As another example, the object information 120 can further comprise a confidence metric indicating how confident the focused object detection system 160 is that the object is, in fact, in the physical scene imaged within the images 110. As yet another example, the object information 120 can comprise sets of coordinates which can delineate an area within the images 110 within which the focused object detection system 160 has detected the object.

While the mechanisms described herein are described with reference to humans and human body parts, they are equally applicable to any objects that are related to an object to be detected. For example, detection of a scoop of ice cream within an image can be focused onto a specific portion of the image based on a preceding detection of an ice cream cone within a different portion of the image. As another example, detection of a bolt within an image can be focused onto a specific portion of an image based upon a preceding detection of a pivot point of a ratchet. Accordingly, the mechanisms described herein are applicable to focus the detection of one object based on the preceding detection of a different object, or of a pivot point around which a different object moves. As utilized herein the term "pivot point" means any point, whether representing a physical limitation or not, that defines a range of motion of an attached, or related, object around it. The aforementioned human joints are, therefore, pivot points as that term is utilized herein.

Figure 2:
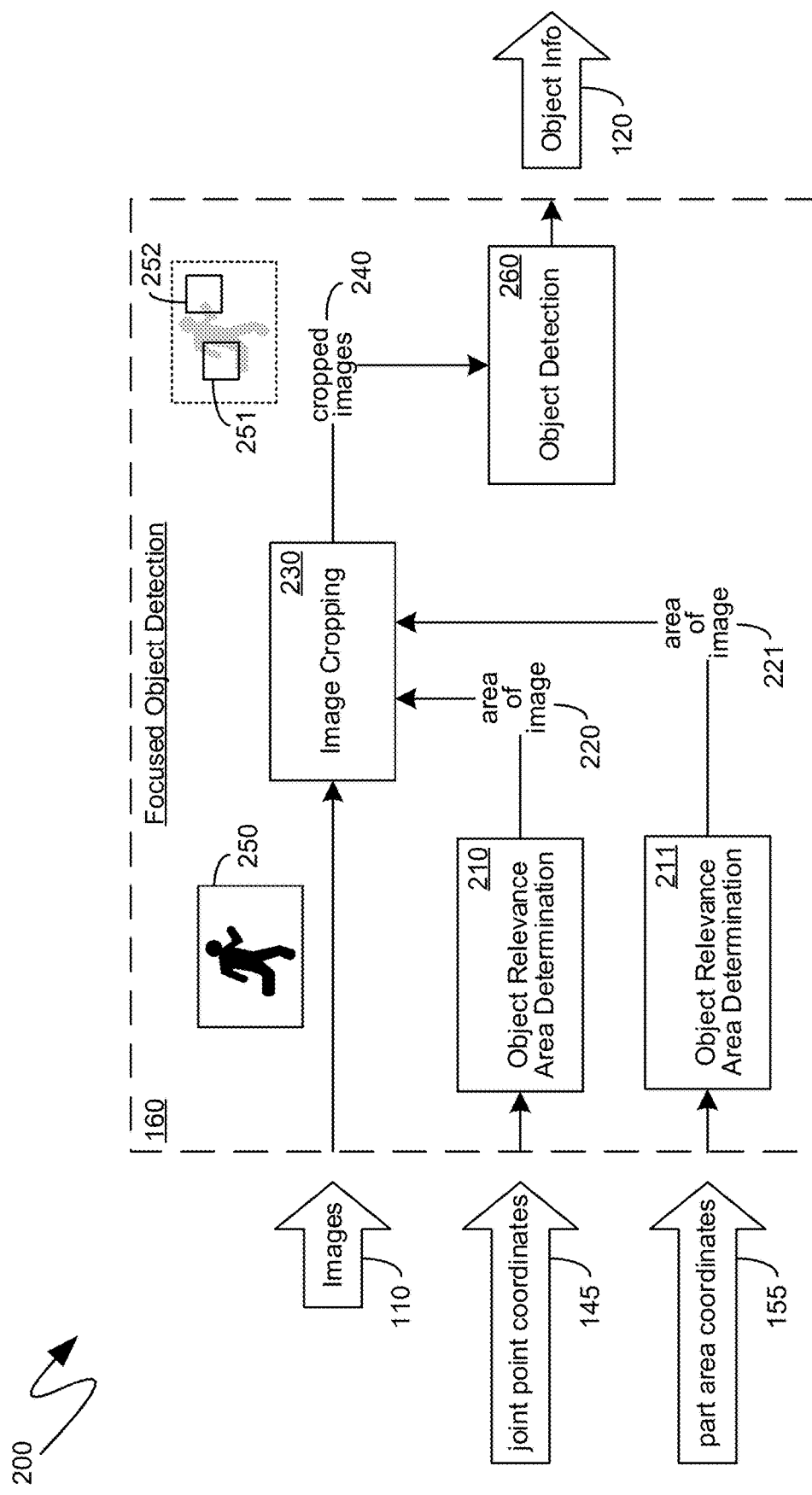
FIG. 2 is a block diagram of an example of a focused object detection utilizing pre-determined coordinates of other objects in an image.

Turning to FIG. 2, the exemplary system 200 shown therein illustrates aspects of the focused object detection system 160 of the exemplary system 100 of FIG. 1. As illustrated in FIG. 2, a focused object detection system, such as the exemplary focused object detection system 160 can receive both images, within which objects are to be detected by the focused object detection system, such as the exemplary images 110, as well as information regarding previously detected objects, such as objects detected by previously executed object detection systems. Within the exemplary system 200 of FIG. 2, the focused object detection system 160 is seen as receiving one or more of the joint point coordinates 145 and/or the part area coordinates 155, which were detailed above.

According to one aspect, the exemplary focused object detection system 160 can comprise object relevance area determinations, such as the exemplary object relevance area determinations 210 and 211. An object relevance area determination can determine image areas, within the images 110, where an object to be detected by the focused object detection system 160 is to be searched for, given physical realities and physical interrelationships between previously detected objects and the object to be detected by the focused object detection system 160. For example, a prior detection of an ice cream cone can inform an area within detection of a scoop of ice cream is to be focused given the physical realities that a scoop of ice cream needs to be supported by an ice cream cone, or other like structure. Accordingly, the physical realities, and physical interrelationships between ice cream scoops and ice cream cones dictate that ice cream scoops are found on top of ice cream cones, as opposed to, for example, being found underneath the ice cream cone with the ice cream scoop supporting the ice cream cone. Such physical realities and physical interrelationships can be programmatically defined by a human implementing an object relevance area determination. For example, an object relevance area determination can be programmed to identify an area, within a digital image, above the area within which an ice cream cone was detected, if the object relevance area determination is being programmed to focus the detection of ice cream scoops. Such programming can include information identifying a specific direction within a physical scene as imaged by the images being analyzed, as well as defining an image area appropriate for the object being detected. For example, utilizing the simple example of an ice cream scoop and an ice cream cone, an object relevance area determination can be programmed to identify any area above an ice cream cone, detected by preceding systems, with the area having a width commensurate with the width of the detected ice cream cone, since an ice cream scoop being supported by an ice cream cone may be a little larger than the ice cream cone itself, but, due to the physical realities, cannot be substantially larger, else it could not be supported by the ice cream cone within the physical realm. Continuing with the above example, the determined area can have a height commensurate with the determined width, since ice cream scoops tended to be circular in shape.

Within the exemplary system 200 of FIG. 2, the exemplary object relevance area determination 210 can determine an area of an image 220 within which an object to be detected by the object detection 260 is to be searched for given the physical realities, and physical interrelationships, between such an object and a human whose joint point coordinates are being provided. For example, if the object to be detected is often carried by a human in their hands, then the object relevance area determination 210 can determine an area 220 based on joint point coordinates 145 that are indicative of an area of a human's hands. For example, if the joint point coordinates 145 identify a right shoulder and a right elbow, the object relevance area determination 210 can extrapolate, from such locations, an area where a right hand would be located. More specifically, the distance from the coordinates of the right shoulder to the coordinates of the right elbow, within the image, can delineate an approximate length, within the image, of a human's upper arm, which is proportionally related to the length of the same human's forearm. Utilizing such a determined length of the human's forearm, an area around the right elbow can be identified as an area within the image within which the right hand would be found, given the physical realities of the connection between the right elbow and the right hand. As another example, if the joint point coordinates 145 included coordinates for the right wrist, then the area 220 determined by the object relevance area determination 210 can be substantially smaller since the physical realities are such that a human's right hand is located in very close proximity to the right wrist.

As can be seen, depending upon the specific joints for which coordinate information is contained within the joint point coordinates 145, the area 220 determined by the object relevance area determination 210 can be greater or less, depending upon the physical realities and/or the physical interrelationships between the joints identified and portions of a human's body that are relevant to the object being detected by the object detection 260. And while the example above was provided within the context of an object that can be carried by a human in their hands, other objects may be relevant to different body parts of a human. For example, if the object to be detected by the object detection 260 is a shoe, then the object relevance area determination 210 will be based upon a determination of the location of the user's foot, within the image, given the joint point coordinates 145.

In some instances, the object to be detected by the object detection 260 can be worn by a human, such as a vest, a hat, gloves, and the like. In such an instance, an identification of an area of a digital image encompassing a corresponding body part can more directly identify an area of the image within which the object detection 260 is to focus. For example, if the part area coordinates 155 include coordinates identifying an area encompassing a human torso, then the object relevance area determination 211 can select an area 221 that can be commensurate therewith if the object to be detected by the object detection 260 is a vest being worn on the torso. The area 221 can be slightly larger to account for variances, the size of the vest, or other like considerations. As indicated previously, such considerations can be specific to the particular object being detected by the object detection 260 and can be programmatically accommodated by the programming of the object relevance area determination 211.

Although the exemplary system 200 illustrates multiple object relevance area determinations, such as the exemplary object relevance area determinations 210 and 211, a single object relevance area determination can identify an area of an image on which the object detection 260 is to be focused. As such, any one of the area 220 and/or the area 221 can be sufficient for the image cropping 230. Alternatively, or in addition, multiple object relevance area determinations can be utilized, and the identified areas can be aggregated by the image cropping 230. For example, the image cropping 230 can crop an image in accordance with a sum of the provided areas. As another example, the image cropping 230 can crop an image in accordance with an overlap area of the provided areas. As yet another example, the image cropping 230 can crop an image in accordance with a majority overlap area, if three or more areas are provided. Additionally, a single object relevance area determination can generate multiple areas that are of relevance, even within a single image. For example, the exemplary image 250 can have multiple areas identified, such as around the hands, as illustrated by the areas 251 and 252.

According to one aspect, as illustrated in FIG. 2, to focus the object detection 260 on a particular portion of an image, the image can be cropped, such as by the image cropping 230, thereby providing the cropped images 240 to the object detection 260. By cropping the images, the image cropping 230 can generate smaller images, that can consume less data, and which can be processed more quickly and efficiently, such as by the object detection 260. The image cropping 230 can crop a single image into a single smaller image, in accordance with the area identified by the object relevance area determination, or it can crop a single image into multiple smaller images, again in accordance with the area identified by the object relevance area determination, such as the exemplary smaller images that would result from the cropping of the image 250, first into the smaller image 251, and then, separately, into the smaller image 252.

The focused object detection system 160 can comprise components that can be executed across multiple different computing devices. For example, the object relevance area determination and image cropping can be performed by a computing device that is co-located with the digital camera capturing the images 110, including being performed by the processing capabilities of the digital camera itself. By contrast, the object detection 260 can be performed by a remote computing device, such as by a service offered over a network, with the service being hosted by, and executed on, one or more server computing devices. In such an instance, transmission of the cropped images 240 can be substantially faster than transmission of the whole image 250, especially in bandwidth-limited situations.

The object detection 260 can then perform image analysis on the cropped images 240. The image analysis performed can be specific to the object being detected. According to one aspect, the object detection 260 can perform image analysis to detect an object within the image utilizing a trained neural network, such as will be detailed further below. By utilizing the cropped images 240, the object detection 260 does not process the other areas of the image 250, since they are not even provided to the object detection 260. Alternatively, the entire image 250 can be provided to the object detection 260, with the image cropping 230 being an optional step. In such an alternative, the object detection 260 can receive the areas determined by the object relevance area determination components and can then focus the object detection on the identified areas, such as in the manner detailed above. As utilized herein, the term "focus the object detection" means that the object detection is only performed on a specific area, to the exclusion of any other areas of the image. According to one aspect, having received the complete image 250, the object detection 260 can focus the object detection on an identified area as an initial step, and can then perform object detection on the other areas of the image as an optional subsequent step. For example, if the object detection 260 does not detect an object within the area on which the object detection was initially focused, a subsequent object detection can be performed on other areas of the image. As another example, such subsequent object detection can be performed based on a time allotment, processing capability allotment, or other like factors.

Figure 3:
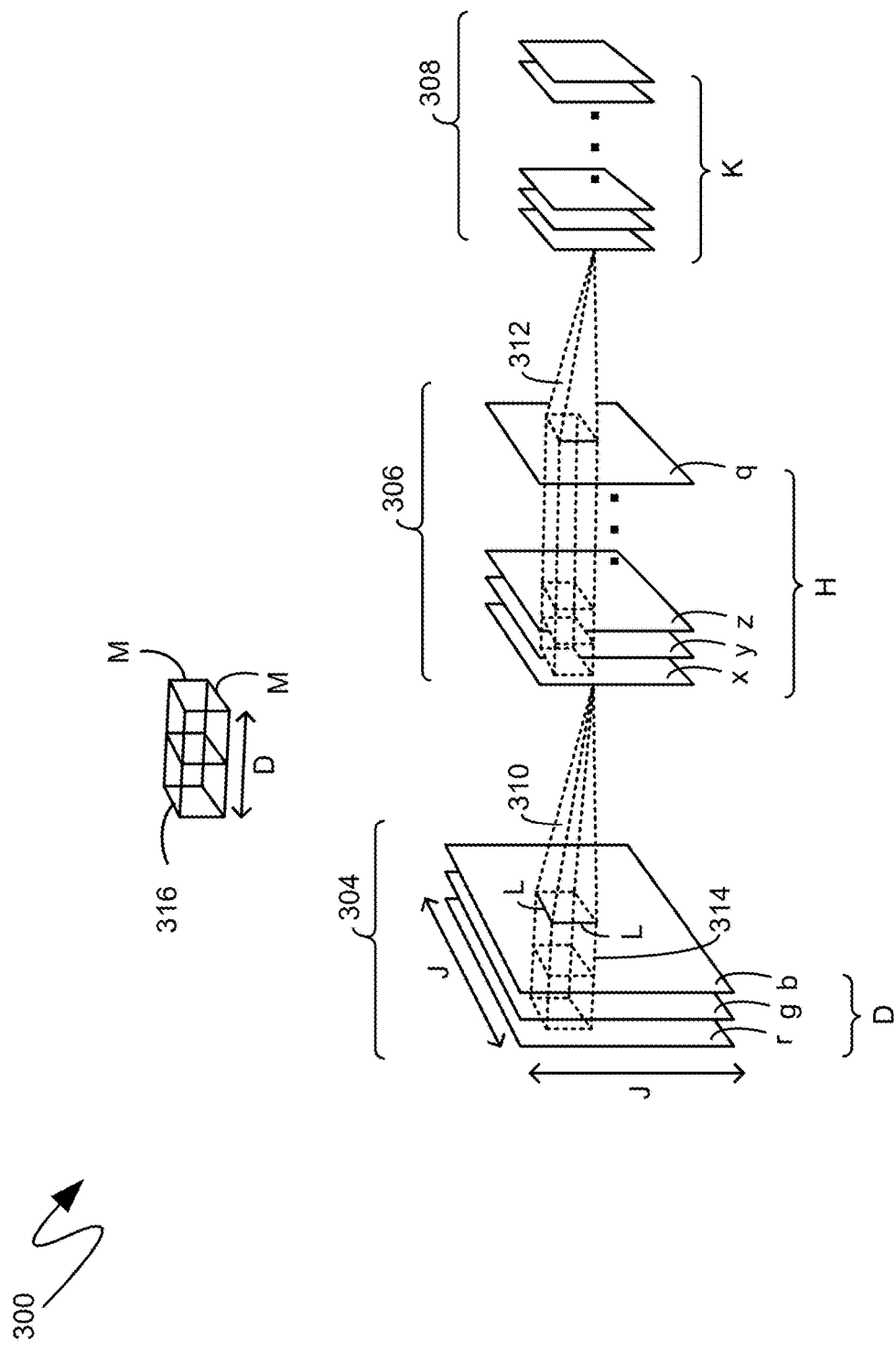
FIG. 3 is a system diagram of an example of a convolution performed by a neural network.

Turning to FIG. 3, the operation of a neural network, such as can be utilized to perform the object detection 260 within a digital image, is illustrated with respect to the exemplary system 300. Neural networks, including deep neural networks (DNNs) and convolution neural networks (CNNs), can achieve high accuracy on human recognition tasks such as image and speech recognition, including the recognition of objects in digital images. Neural networks may include a number of different processing "layers", including dense, or fully-connected, layers, convolutional layers, pooling layers, normalization layers, and the like. Outputs of convolutional layers may be processed with pooling layers, which subsample the convolved output, and can be further processed with activation functions, which are typically nonlinear functions, such as sigmoid or tan h. FIG. 3 is a simplified diagram depicting a three-dimensional (3D) CNN 300 that includes three exemplary 3D volumes, namely the exemplary volumes 303, 306, 308. Each 3D volume 303, 306, 308 can represent an input to a layer, and can be transformed into a new 3D volume that feeds a subsequent layer. In the example of FIG. 3, there are two convolutional layers, namely the exemplary convolution layers 310 and 312. Volume 304, with 3 planes, can be an input to convolutional layer 310, which can generate volume 306, with H planes, which, in turn, can be an input to convolutional layer 312, which can generate volume 308, with K planes.

For example, volume 304 can include image data in three planes, such as the well-known "red", "green" and "blue" layers of a color image. Each plane can include a two-dimensional array of data. For example, if the exemplary volume 304 was a portion of an image, then the portion could be, for example, one-hundred pixels wide by one-hundred pixels high. In such an instant, the variable "J", shown in FIG. 3, can be a value of one hundred. More or fewer than three planes may be used, and each plane need not include a square array.

A 3D input volume, such as the exemplary input volume 314, can be convolved with weight kernels. For example, as shown in FIG. 3, the exemplary input volume 314 can be of dimensions L×L×D, where D is three in the present example. Such an exemplary input volume can be convolved with kernel weights, such as the exemplary kernel weights 316, which can also have a dimension of L×L×D, with, again, the dimension D being three in the present example. Each kernel weight can shifted in a sliding-window-like fashion across the input volume, such as the exemplary volume 304. A stride value can define an amount of such a shift offset. During each shift, each weight in the 3D kernel weight is multiplied and added with corresponding pair-wise input elements from the overlapping region of input volume 314.

Figure 4A:
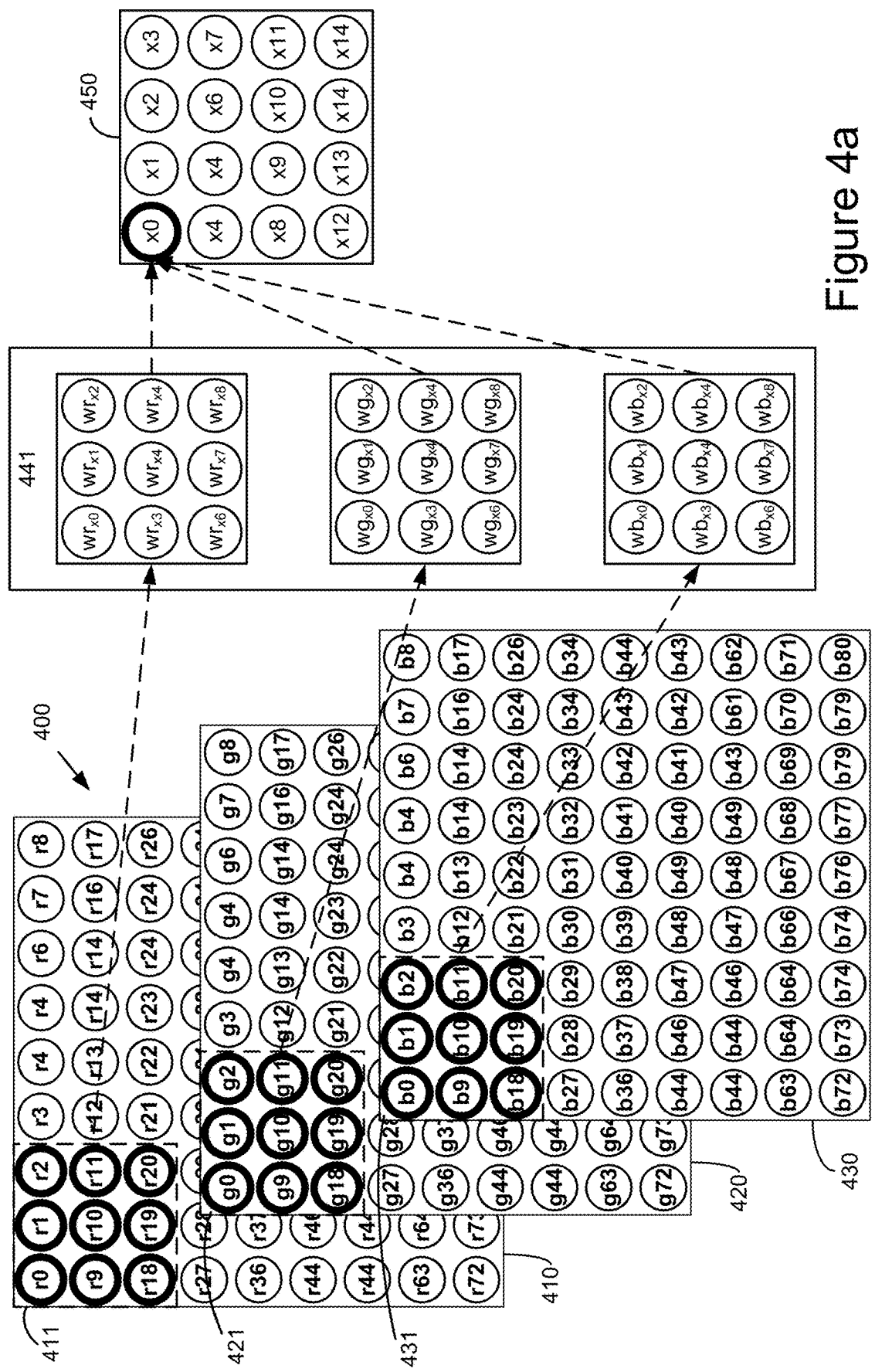
FIGS. 4a-4d are block diagrams of portions of an example of a convolution performed by a neural network.
Figure 4B:
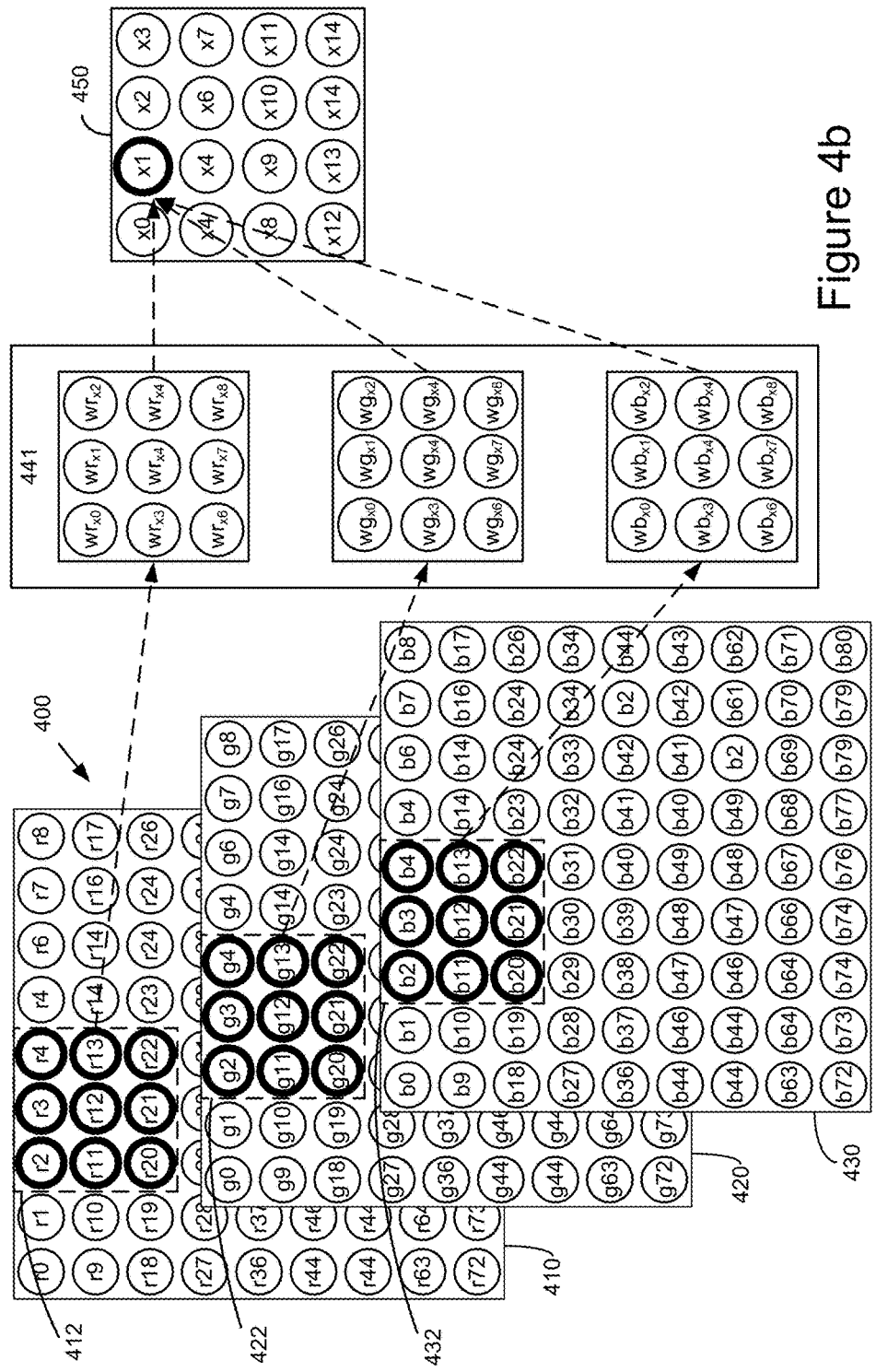
Figure 4C:
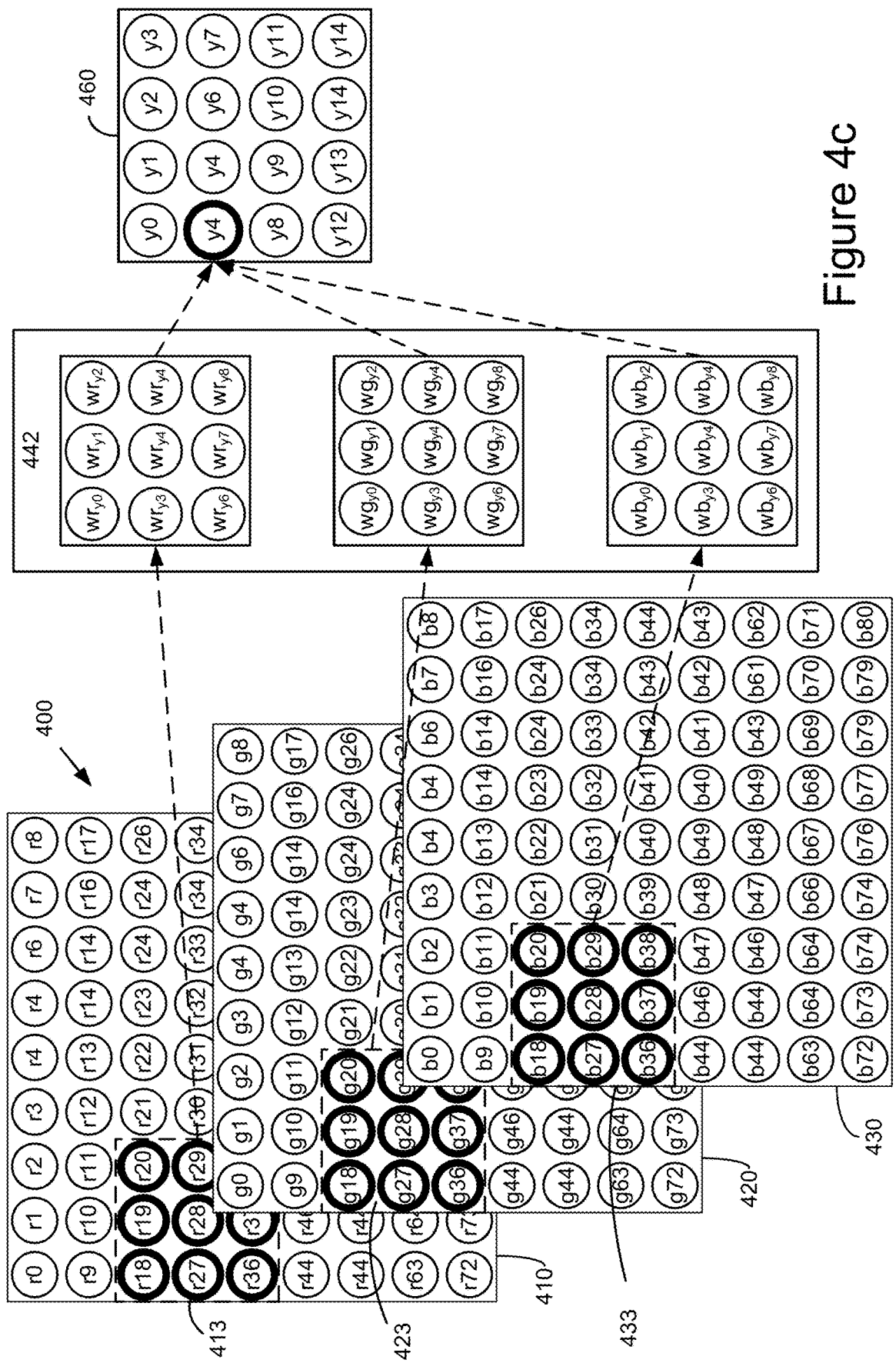
Figure 4D:
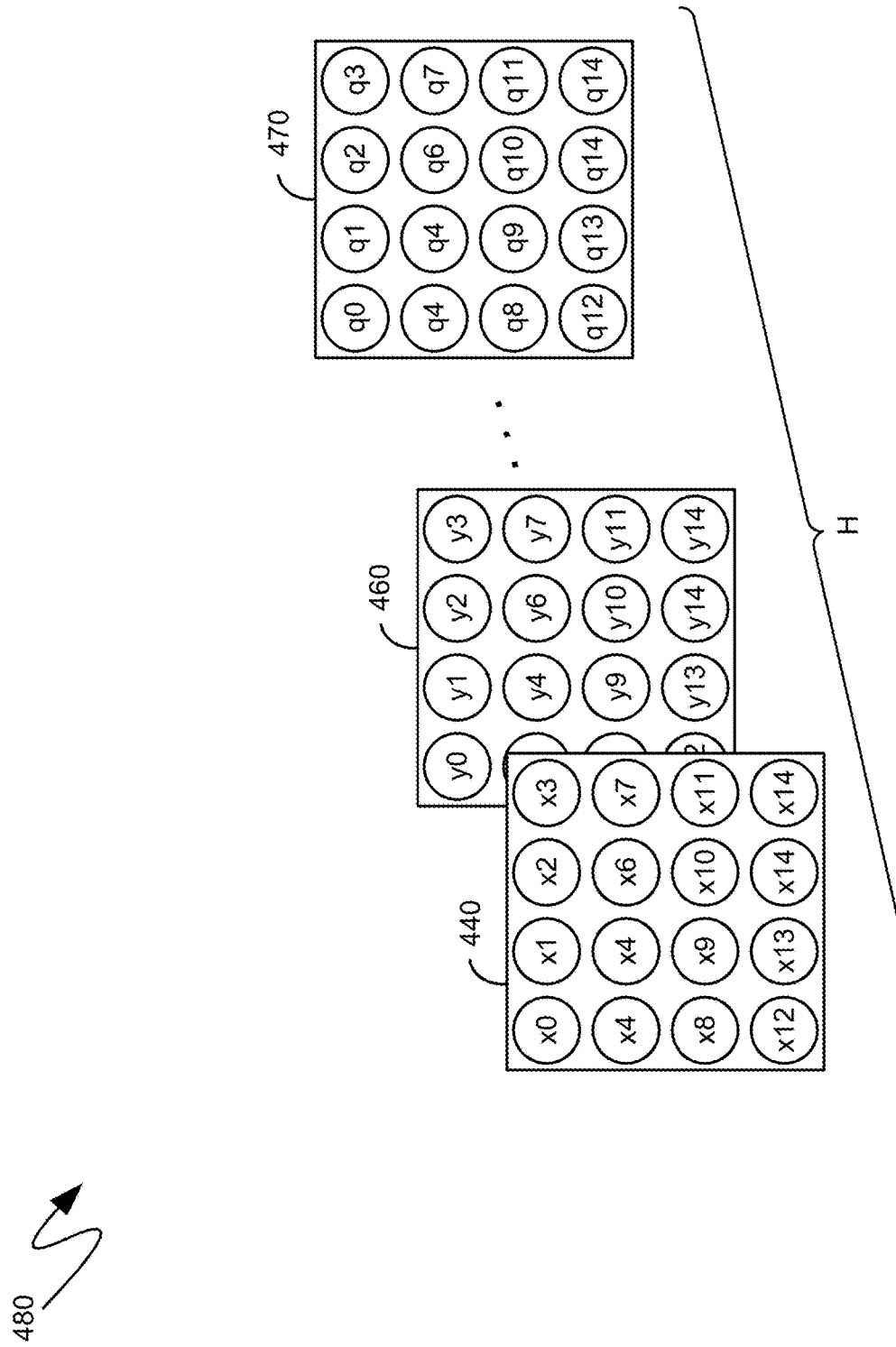

Such a process is illustrated in greater detail in FIGS. 4a-4d. More specifically, FIG. 4a shows an exemplary convolution of a volume, namely the exemplary volume 400, with a set of kernel weights, namely the exemplary kernel weights 441, to generate a first plane 450 of a second volume 480, that is shown in FIG. 4d. The exemplary first volume 400 can comprise three planes, namely the three exemplary planes 410, 420 and 430, with a nine-by-nine array of image data, for example. As indicated above, in the context of image data, the three exemplary planes can comprise a single plane of each of the colors red, green and blue. Each of a first set of kernel weights 441 can have an exemplary dimensionality of three-by-three-by-three.

As illustrated in FIG. 4*a*, data value x0 of an exemplary first plane 450 of the exemplary second volume 480 can be determined by multiplying every weight in the first set of kernel weights 441 with every pair-wise input element from the overlapping region of a first input volume, such as the overlapping regions 411, 421 and 431. According to one aspect, the data value x0 can be expressed as follows:

$$x0 = \begin{pmatrix} r0 & r1 & r2 \\ r9 & r10 & r11 \\ r18 & r19 & r20 \end{pmatrix} \begin{pmatrix} wr_{x0} & wr_{x3} & wr_{x6} \\ wr_{x1} & wr_{x4} & wr_{x7} \\ wr_{x2} & wr_{x5} & wr_{x8} \end{pmatrix} +$$
$$\begin{pmatrix} g0 & g1 & g2 \\ g9 & g10 & g11 \\ g18 & g19 & g20 \end{pmatrix} \begin{pmatrix} wg_{x1} & wg_{x3} & wg_{x6} \\ wg_{x1} & wg_{x4} & wg_{x7} \\ wg_{x2} & wg_{x5} & wg_{x8} \end{pmatrix} +$$
$$\begin{pmatrix} b0 & b1 & b2 \\ b9 & b10 & b11 \\ b18 & b19 & b20 \end{pmatrix} \begin{pmatrix} wb_{x1} & wb_{x3} & wb_{x6} \\ wb_{x1} & wr_{x4} & wb_{x7} \\ wb_{x2} & wb_{x5} & wb_{x8} \end{pmatrix}$$

First set of kernel weights 441 can then slide by a quantity of horizontal data values of first volume 400 determined by the stride value. FIG. 4*b* illustrates a stride value of two. Thus, as illustrated in FIG. 4*b*, data value x1 of the exemplary first plane 450 of the exemplary second volume 480 can determined by multiplying every weight in the first set of kernel weights 441 with every pair-wise input element from a slid overlapping region of a second input volume, such as the exemplary slid overlapping region 412, 422 and 432. According to one aspect, the data value x1 can be expressed as follows:

$$x1 = \begin{pmatrix} r2 & r3 & r4 \\ r11 & r12 & r13 \\ r20 & r21 & r22 \end{pmatrix} \begin{pmatrix} wr_{x0} & wr_{x3} & wr_{x6} \\ wr_{x1} & wr_{x4} & wr_{x7} \\ wr_{x2} & wr_{x5} & wr_{x8} \end{pmatrix} +$$
$$\begin{pmatrix} g2 & g3 & g4 \\ g11 & g12 & g13 \\ g20 & g21 & g22 \end{pmatrix} \begin{pmatrix} wg_{x1} & wg_{x3} & wg_{x6} \\ wg_{x1} & wg_{x4} & wg_{x7} \\ wg_{x2} & wg_{x5} & wg_{x8} \end{pmatrix} +$$
$$\begin{pmatrix} b0 & b1 & b2 \\ b11 & b12 & b13 \\ b20 & b21 & b22 \end{pmatrix} \begin{pmatrix} wb_{x1} & wb_{x3} & wb_{x6} \\ wb_{x1} & wr_{x4} & wb_{x7} \\ wb_{x2} & wb_{x5} & wb_{x8} \end{pmatrix}$$

Such a process can continue, with the first set of kernel weights 441 sliding two horizontal values, in the illustrated example, of the exemplary first volume 400, with each iteration, until the first row of data values (x0, x1, x3, x3) of first plane 450 is complete. The first set of kernel weights 441 can then slide down, for example, two rows and back to the leftmost column of first volume 400 to calculate the second row of data values (x4, x5, x6, x7) of first plane 450. This process can continue until all four rows of data values of the first plane 450 are complete.

As illustrated in FIG. 4*c*, the exemplary data value y4 of the exemplary second plane 460 of second volume 408 can be determined by multiplying every weight in the second set of kernel weights 442 with every pair-wise input element from the down-slid overlapping region 413, 423 and 433. According to one aspect, the data value y4 can be expressed as follows:

$$y4 = \begin{pmatrix} r18 & r19 & r20 \\ r27 & r28 & r29 \\ r36 & r37 & r38 \end{pmatrix} \begin{pmatrix} wr_{y0} & wr_{y3} & wr_{y6} \\ wr_{y1} & wr_{y4} & wr_{y7} \\ wr_{y2} & wr_{y5} & wr_{y8} \end{pmatrix} +$$
$$\begin{pmatrix} g18 & g19 & g20 \\ g27 & g28 & g29 \\ g36 & g37 & g38 \end{pmatrix} \begin{pmatrix} wg_{y1} & wg_{y3} & wg_{y6} \\ wg_{y1} & wg_{y4} & wg_{y7} \\ wg_{y2} & wg_{y5} & wg_{y8} \end{pmatrix} +$$
$$\begin{pmatrix} b18 & b19 & b20 \\ b27 & b28 & b29 \\ b36 & b37 & b38 \end{pmatrix} \begin{pmatrix} wb_{y1} & wb_{y3} & wb_{y6} \\ wb_{y1} & wr_{y4} & wb_{y7} \\ wb_{y2} & wb_{y5} & wb_{y8} \end{pmatrix}$$

Such a process can continue until all data values of second plane 460 of second volume 480 are complete, and also continues for each of the H weight volumes to generate the H planes in of second volume 480. Referring again to FIG. 4, volume 406, determined such as in the manner illustrated by FIGS. 4*a*-4*d*, and detailed above, then becomes an input layer to convolutional layer 312, which can include K weight volumes to generate the K planes of volume 308.

According to one aspect, the values of the weights utilized in the convolutions detailed above can be derived as part of the "training" of a neural network. Typically, such training starts with initial weight values and then proceeds iteratively, where, for each iteration, the weight values are modified in accordance with information, such as gradient information, obtained during the processing of a prior iteration. As such, the training typically entails the performance of so-called "forward" processing, or forward propagation, and "backwards" processing, or backpropagation. More specifically, forward propagation of one or more input activations through the neural network can be utilized to generate output activations, which can be "predictions" whose "errors" then further tune the weight values. In particular, gradients can be determined for each of the neurons in the neural network via back-propagation of such "errors" from the output layer back to the input layer. Such gradients can then be utilized to update the weights at each neuron. Repetition of such processes can continue until the weights converge.

One implementation of a backpropagation algorithm has the weights updated in an iterative fashion using labeled training data. As indicated, a goal of backpropagation is to employ a method of gradient descent to minimize an error function with respect to all weights in the network. Using gradient descent, all weights in the neural network are incrementally updated using gradients that are calculated for each neuron. This process is repeated iteratively using a large quantity of pre-labeled input data (representing known data) until the weight values converges on a set of trained weight values that can be used for prediction, namely when the model is deployed.

In gradient descent, several choices can be available for selecting a number of inputs to use per iteration. A first method, batch gradient descent, can utilize all available training data, such as, for example, pre-labeled images, in each iteration between weight updates. This method can be very expensive. A second method, stochastic gradient descent, can represent another extreme by selecting one random example from the corpus between weight updates. A third method, mini-batch gradient descent, can use a random subset of the corpus to perform gradient computation, followed by a single weight update. In practice, mini-batch gradient descent can often be a good balance between training accuracy and training time. Furthermore, mini-batching can facilitate implementation of available parallelism in hardware, by allowing gradients for different inputs to be computed in parallel (without a serial dependence on weight updates).

For purposes of training a neural network implanting the exemplary object detection 260, a training set can be utilized which can comprise images and corresponding information indicating the presence of the object to be detected (or the lack of such a presence) within those images. The weights of the neural network can then be established, such as in accordance with the detailed descriptions provided above. In operation, then, a receipt of an image, such as the exemplary image 250, or one or more of the cropped images 251 and 252, can be processed by the neural network implementing the exemplary object detection 260, and an output, such as a detection of one or more objects within the provided images, can be generated.

Figure 5:
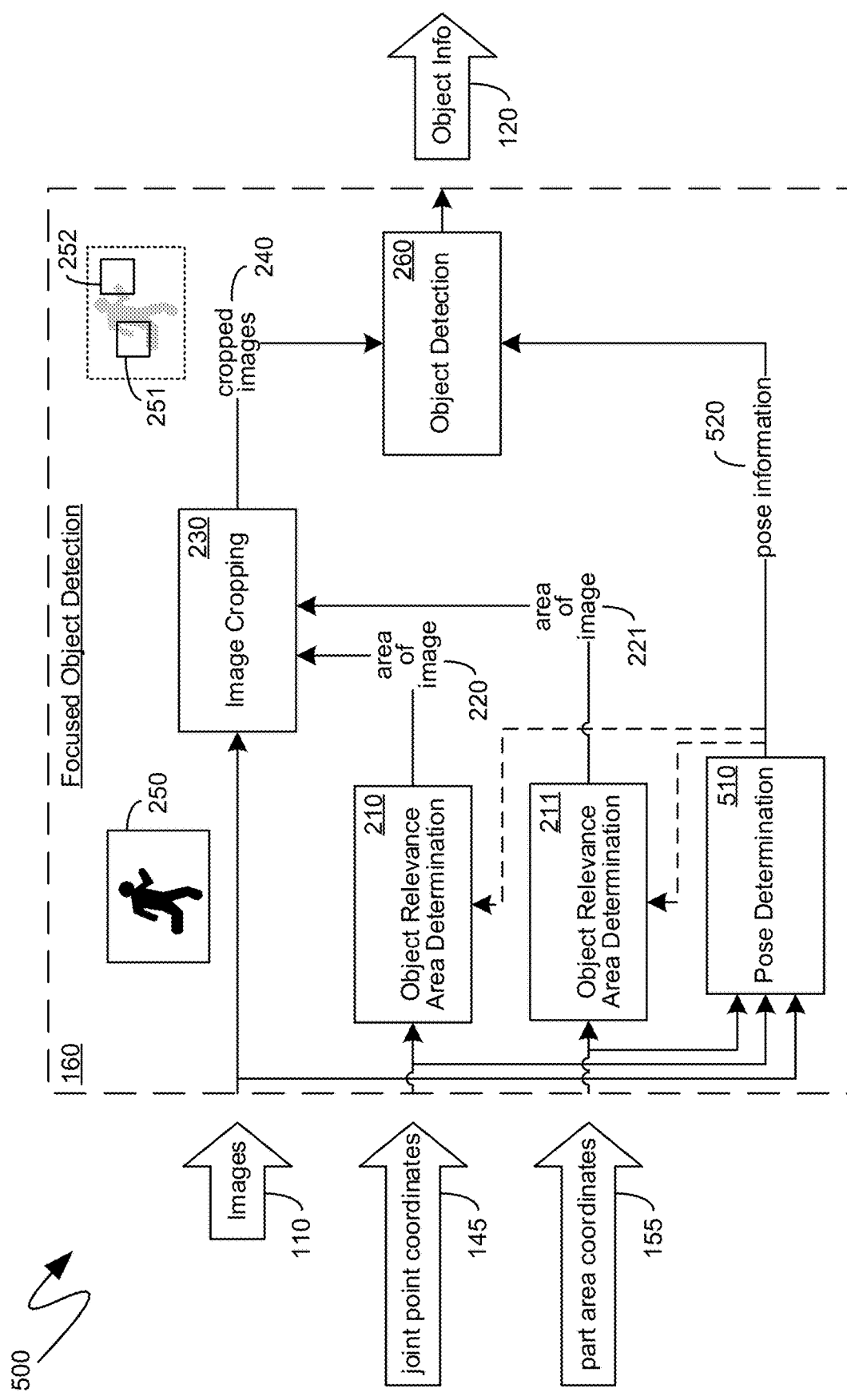
FIG. 5 is a block diagram of an example of a focused object detection utilizing human pose determination.

Turning to FIG. 5, the exemplary system 500 shown therein illustrates an exemplary utilization of derivative information that can be derived from the preceding object detections. Within the specific context of human-based object detections, such as the preceding human joint detection system 140 and/or the preceding human body part detection system 150, which were shown in FIG. 1 and described above, the information generated by such preceding object detection systems, namely the joint point coordinates 145 and/or the part area coordinates 155, can be utilized to derive further information that can inform the focused object detection, such as the focused object detection being performed by the exemplary object detection 260. More specifically, the joint point coordinates 145 and/or the part area coordinates 155 can be utilized to derive information regarding the pose of the human represented by those coordinates.

Such pose information 520 can further inform the object detection 260. For example, the physical realities and interrelationships between humans and objects to be detected by the object detection 260 can be such that humans utilizing, carrying, or otherwise interacting with such objects position their bodies in specific poses. For example, if the object detection 260 was directed towards detecting guns in digital images, the pose information 520 can include information that a human is in a shooting pose, such as crouched down with arms extended in front of the head. Such pose information 520 can then inform the object detection 260. For example, the pose information 520 can further refine the area of a digital image on which the object detection 260 is focused, such as the area of the user's hands in the shooting pose example provided above. According to one aspect, such a refinement can be performed by the object relevance area determinations, as illustrated by the dashed lines in FIG. 5 indicating the optional provision of pose information 522 one or more of the object relevance area determination 210 and 211.

As another example, the pose information 520 can adjust a threshold confidence level of the object detection 260. More specifically, the object detection 260, utilizing a trained neural network, such as that detailed above, can generate an output that is indicative of a confidence level, or otherwise indicating on a predefined scale, such as between zero and one, the certainty with which the object detection 260 has detected an object. Such information can then be translated into a binary determination that an object either is, or is not, present in the physical scene imaged by the image. For purposes of translating the confidence level into the yes/no binary determination, comparison to a threshold confidence level can be made. Within the exemplary system 500 shown in FIG. 5, the pose information 520 can inform such a threshold confidence level. For example, the pose information 520 can lower the threshold confidence level. Consequently, the object detection 260 may determine that a focused portion of an image, on which the object detection 260 has focused, contains a gun, but the confidence level may be below an initial threshold confidence level. However, if the human imaged in the image is in a shooting pose, as provided by the pose information 520, the initial threshold confidence level can be lowered below the confidence level assigned by the object detection 260, thereby resulting in a binary determination that a gun is present in the physical scene. The lowering of such a threshold confidence level can be colloquially expressed in that the object detection 260 may not have been "sufficiently certain" that it had detected a gun, but, given the pose information 520 that the human in the physical scene was in a shooting position, it is likely that what the object detection 260 did detect, was, in fact a gun.

According to one aspect, the pose information 510 can be a form of object detection, receiving, as input, one or more of the images 110, the joint point coordinates 145 and/or the part area coordinates 155. Accordingly, the pose information 510 can be implemented by a trained neural network in a manner analogous to that of the object detection 260, which was described in detail above. For purposes of training a neural network implanting the exemplary pose determination 510, a training set can be utilized which can comprise images of humans and corresponding pose information, such as whether the humans in those images are standing, stretching, crouching, or other like pose categorizations. The weights of the neural network can then be established, such as in accordance with the detailed descriptions provided above. In operation, then, a receipt of an image, such as the exemplary image 250, can be processed by the neural network implementing the exemplary pose determination 510, and an output, such as an identification of one or more determined poses, can be generated, such as detailed above.

Additionally, the training of the neural network implanting the exemplary pose determination 510 can be based on a training set which, in addition to the images of humans and the corresponding pose information, can further comprise the output of the human joint detection 140, namely the joint point coordinates 145, corresponding to those images and/or the output of the human body part detection 150, namely the part area coordinates 155, corresponding to those images. In such a manner, the neural network implanting the exemplary pose determination 510 can establish weight values, such as detailed above, that take into account joint point coordinates and/or part area coordinates in determining a pose, should such joint point coordinates and/or part area coordinates be providable as input to the pose determination 510. Such weights can then be utilized by the neural network implanting the exemplary pose determination 510 to output the pose information 520 when provided the joint point coordinates 145 and/or the part area coordinates 155 as input, in addition to the input images 110.

While the object relevance area determination has been described above with reference to a static set of joint point coordinates and/or part area coordinates, additional object relevance area determinations can be performed utilizing a time-based sequence of joint point coordinates and/or part area coordinates showing movement across the span of time covered by the time-based sequence. For example, a time-based sequence of joint point coordinates can be of a human running, with one instance of the time-based sequence comprising one set of joint point coordinates representing the human at one moment in time, a subsequent instance of the time-based sequence comprising another set of joint point coordinates representing the human at a subsequent moment in time, such as the moment in time next captured by a subsequent frame of a video sequence, and so on.

According to one aspect an object relevance area determination can receive such a time-based sequence of joint point coordinates and can derive a direction in which the human is moving. Such a derivation can be programmatically simple, such as by determining a direction of change of discrete coordinates, such as the coordinates for the running human's knees, or it can be programmatically more complex, such as through a trained neural network, such as that detailed above, that can be trained to detect running, as compared with, for example, other types of human motion, given a time-based sequence of joint point coordinates. The direction of movement can then inform the object relevance area determination. For example, the object relevance area determination can be an area of one or more of the images from which the time-based sequence of joint point coordinates is derived that the human is running away from. Such an object relevance area determination can be applicable if the object to be detected is dangerous or would cause people to run away from. As another example, the object relevance area determination can be an area of one or more of the images from which the time-based sequence of joint point coordinates is derived that the human is running towards. Such an object relevance area determination can be applicable if the object to be detected is desirable or would cause people to run towards such an object.

Additionally, while the descriptions above have been provided within the context of a single human, or a single object, they are equally applicable to multiple objects. For example, the object relevance area determinations can determine multiple areas of an image based on multiple sets of joint point coordinates, one set for each human in a corresponding image frame. As another example, the above descriptions related to object relevance area determinations based on motion can be further based on the motion of multiple humans, including determinations based on the multiple humans moving as a group, or individually, with each human motion pointing towards or away from a specific origin or destination point that can be identified as an area on which the object detection is to focus.

Figure 6:
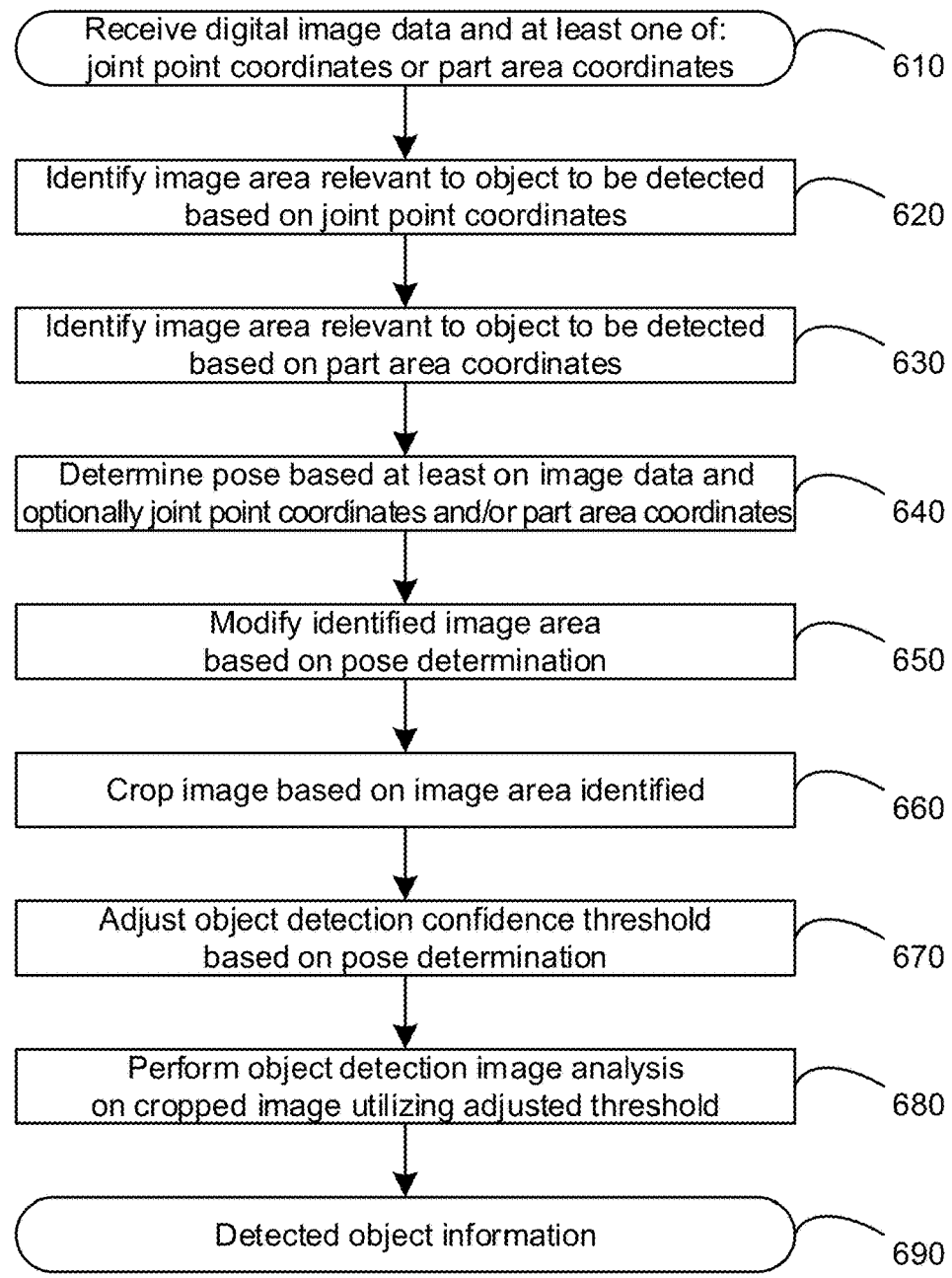
FIG. 6 is a flow diagram of an example of focused computer detection of objects in images.

Turning to FIG. 6, an exemplary flow diagram 600 is illustrated, depicting mechanisms by which the focused object detection detailed above can be performed. Initially, at step 610, digital image data can be received. Such digital image data can be in the form of still digital images or a digital video stream comprising individual digital image frames. Additionally, preceding object detection systems can provide information that can also be received at step 610, including at least one of the aforedescribed joint point coordinates or part area coordinates. Alternatively, only the digital image data can be received at step 610, with the preceding object detection systems being either locally executed, such as on a same computing device performing the steps of the exemplary flow diagram 600, or on other computing devices within a single system performing the steps of the exemplary flow diagram 600.

In relevant part, after receipt of input at step 610, an image area relevant to the object to be detected can be identified. For example, if joint point coordinates are received, then, at step 620, an image area relevant to the object to be detected based on such joint point coordinates can be determined. As another example, if part area coordinates are received, then, at step 630, an image area relevant to the object to be detected based on such part area coordinates can be determined. Although illustrated as occurring sequentially, steps 620 and 630 can be performed in parallel. Additionally, steps 620 and 630 can be performed iteratively, with the output of one becoming the input of the other, and then continuing in such a manner until the identified image area has been refined.

Optionally, at step 640 at least one of image data, joint point coordinates and/or part area coordinates can be utilized to determine a pose of a human in the physical scene imaged by the digital image whose data is received. If such a pose is determined at step 640, optionally the image area identified at one or more of steps 620 and/or 630 can be modified, such as is illustrated by step 650. Subsequently, a received digital image can be cropped based on the image area identified, such as is illustrated by step 660. Alternatively, step 660 can represent the focusing of object detection mechanisms on a specific portion of a digital image, to the exclusion of other portions. If pose information was obtained at step 640, then, at step 670 an object detection confidence threshold can be adjusted based on such pose information, such as was detailed previously. Object detection can then be performed utilizing computer digital image analysis, such as by a trained neural network, on a focused portion, or a cropped portion, of the digital image at step 680. Output indicative of whether or not an object was detected can then be generated at step 690.

Figure 7:
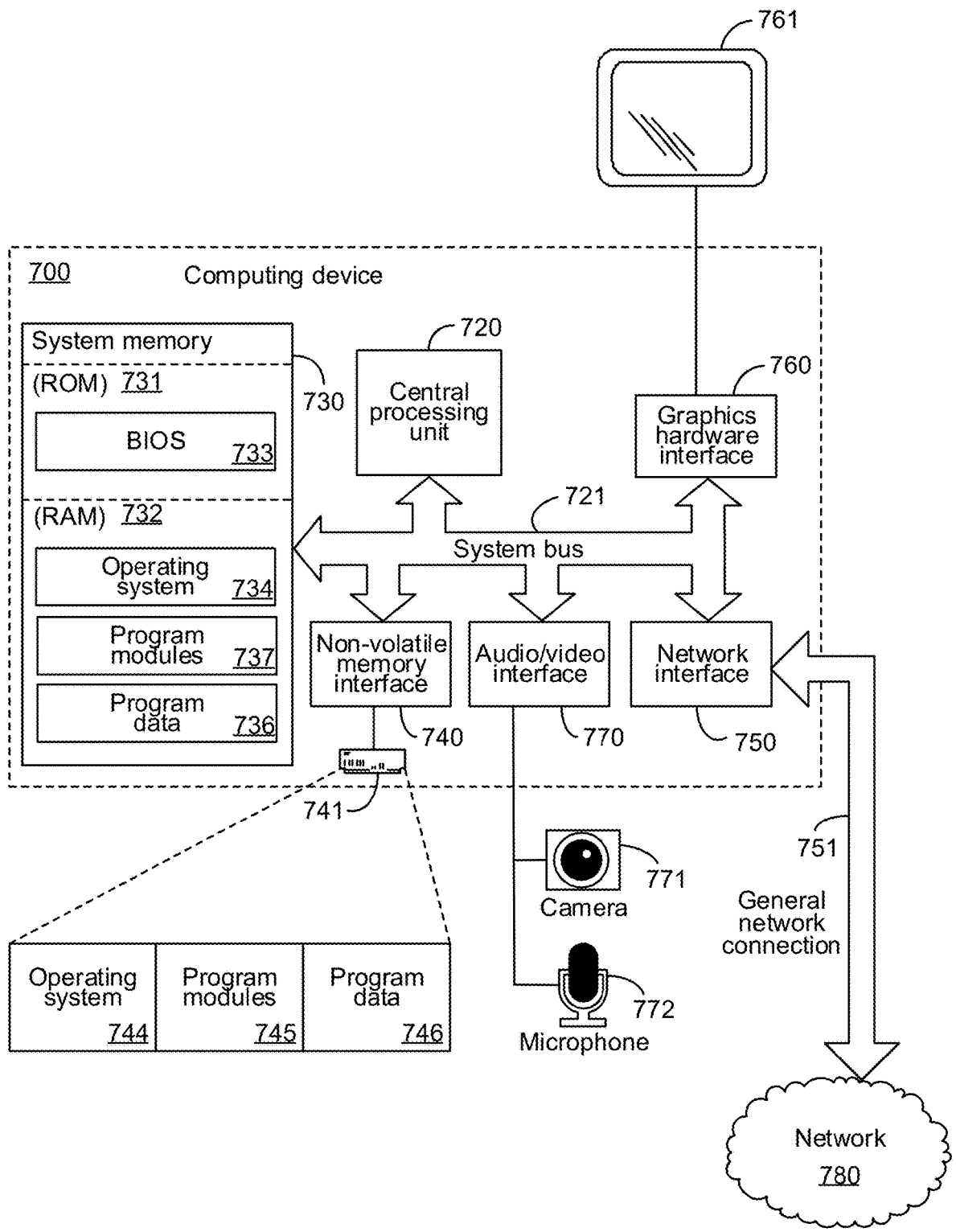
FIG. 7 is a block diagram of an example of a computing device.

Turning to FIG. 7, an exemplary computing device 700 is illustrated which can perform some or all of the mechanisms and actions described above. The exemplary computing device 700 can include, but is not limited to, one or more central processing units (CPUs) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. The computing device 700 can optionally include graphics hardware, including, but not limited to, a graphics hardware interface 760 and a display device 761, which can include display devices capable of receiving touch-based user input, such as a touch-sensitive, or multi-touch capable, display device. Additionally, the computing device 700 can optionally include an audio/video interface, such as the exemplary audio/video interface 770 that can be communicationally coupled to the system bus 721 and can support standardized peripheral and/or extension communication protocols to allow additional hardware devices to be communicationally coupled with the computing device 700. By way of example, the exemplary camera 771 and/or microphone 772 can be communicationally coupled to the system bus 721 via the audio/video interface 770. The exemplary camera 771 and/or microphone 772 can be part of the physical housing of the computing device 700, or can be separate peripheral hardware devices that are communicationally coupled to the exemplary computing device 700. While illustrated as being communicationally coupled to the computing device 700 through the audio/video interface 770, the exemplary camera 771 and/or microphone 772 can be communicationally coupled to the system bus 721 via the network 780 and the general network connection 751 thereto provided by the network interface 750, as detailed below. Depending on the specific physical implementation, one or more of the CPUs 720, the system memory 730 and other components of the computing device 700 can be physically co-located, such as on a single chip. In such a case, some or all of the system bus 721 can be nothing more than silicon pathways within a single chip structure and its illustration in FIG. 7 can be nothing more than notational convenience for the purpose of illustration.

The computing device 700 also typically includes computer readable media, which can include any available media that can be accessed by computing device 700 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 700. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer content between elements within computing device 700, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, other program modules 735, and program data 736.

The computing device 700 may also include other removable/non-removable, volatile/nonvolatile computer storage media. By way of example only, FIG. 7 illustrates a hard disk drive 741 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 741 is typically connected to the system bus 721 through a non-volatile memory interface such as interface 740.

The drives and their associated computer storage media discussed above and illustrated in FIG. 7, provide storage of computer readable instructions, data structures, program modules and other data for the computing device 700. In FIG. 7, for example, hard disk drive 741 is illustrated as storing operating system 744, other program modules 745, and program data 746. Note that these components can either be the same as or different from operating system 734, other program modules 735 and program data 736. Operating system 744, other program modules 745 and program data 746 are given different numbers hereto illustrate that, at a minimum, they are different copies.

The computing device 700 may operate in a networked environment using logical connections to one or more remote computers. The computing device 700 is illustrated as being connected to the general network connection 751 (to the network 780) through a network interface or adapter 750, which is, in turn, connected to the system bus 721. In a networked environment, program modules depicted relative to the computing device 700, or portions or peripherals thereof, may be stored in the memory of one or more other computing devices or stand-alone peripheral computing devices that are communicatively coupled to the computing device 700 through the general network connection 751. It will be appreciated that the network connections shown are exemplary and other means of establishing a communications link between computing devices may be used.

Although described as a single physical device, the exemplary computing device 700 can be a virtual computing device, in which case the functionality of the above-described physical components, such as the CPU 720, the system memory 730, the network interface 740, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 700 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a computing device comprising: a one or more processing units; and computer-readable media comprising computer-executable instructions, which, when executed by at least some of the one or more processing units, cause the computing device to: obtain a first digital image of a physical scene; obtain a first set of coordinates within the first digital image, the first set of coordinates identifying at least one of: a first image area corresponding to a first object in the physical scene or a first image point corresponding to a first pivot point in the physical scene to which the first object is pivotably coupled; identify a second image area relevant to a second object to be detected in the first digital image based on the first set of coordinates, the second image area being only a portion of the first digital image; perform digital image analysis on only the second image area, to the exclusion of other areas of the first digital image, the digital image analysis identifying a first set of pixels of the second image area and a first confidence that the first set of pixels are of the second object in the physical scene; and generating an indication that the second object was detected in the physical scene if the first confidence is greater than a threshold confidence level.

A second example is the computing device of the first example, wherein the computer-executable instructions which cause the computing device to identify the second image area relevant to the second object comprise computer-executable instructions, which, when executed, cause the computing device to identify the second image area as surrounding the first image area.

A third example is the computing device of the first example, wherein the computer-executable instructions which cause the computing device to identify the second image area relevant to the second object comprise computer-executable instructions, which, when executed, cause the computing device to identify the second image area as adjacent to the first image point.

A fourth example is the computing device of the first example, wherein the computer-readable media comprise further computer-executable instructions, which, when executed, cause the computing device to: perform a subsequent digital image analysis on the other areas of the first digital image, the subsequent image identifying a second set of pixels of the other areas of the first digital image and a second confidence that the second set of pixels are of the second object in the physical scene.

A fifth example is the computing device of the first example, wherein the physical scene comprises a first human; and wherein the first object is a body part of the first human and the first pivot point is a joint of the first human.

A sixth example is the computing device of the fifth example, wherein the computer-executable instructions which cause the computing device to obtain the first set of coordinates comprise computer-executable instructions, which, when executed, cause the computing device to obtain, with the first set of coordinates, an identification of at least one of: which body part of the first human or which joint of the first human is delineated by the first set of coordinates; and wherein the computer-executable instructions which cause the computing device to identify the second image area relevant to the second object comprise computer-executable instructions, which, when executed, cause the computing device to identify the second image area based on which body part of the first human or which joint of the first human is delineated by the first set of coordinates.

A seventh example is the computing device of the sixth example, wherein the computer-executable instructions which cause the computing device to identify the second image area relevant to the second object comprise computer-executable instructions, which, when executed, cause the computing device to: estimate a third image area corresponding to the first human's hand within the physical scene; and identify the second image area as surrounding the third image area to detect the second object being carried by the first human within the physical scene.

An eighth example is the computing device of the fifth example, wherein the computer-readable media comprise further computer-executable instructions, which, when executed, cause the computing device to: determine a pose of the first human in the physical scene based on the first digital image.

A ninth example is the computing device of the eighth example, wherein the computer-executable instructions which cause the computing device to determine the pose comprise computer-executable instructions, which, when executed, cause the computing device to: determine the pose of the first human in the physical scene based on the first digital image and the first set of coordinates.

A tenth example is the computing device of the eighth example, wherein the computer-readable media comprise further computer-executable instructions, which, when executed, cause the computing device to: modify the second image area based on the determined pose of the first human in the physical scene; and wherein the computer-executable instructions which cause the computing device to perform the digital image analysis on only the second image area comprise computer-executable instructions, which, when executed, cause the computing device to perform the digital image analysis on only the modified second image area.

An eleventh example is the computing device of the eighth example, wherein the computer-readable media comprise further computer-executable instructions, which, when executed, cause the computing device to: modify the threshold confidence level based on the determined pose of the first human in the physical scene.

A twelfth example is the computing device of the eleventh example, wherein the computer-executable instructions which cause the computing device to modify the threshold confidence level comprise computer-executable instructions, which, when executed, cause the computing device to: decrease the threshold confidence level when the determined pose of the first human in the physical scene is a pose of a human utilizing an object of a same type as the second object.

A thirteenth example is the computing device of the first example, wherein the computer-readable media comprise further computer-executable instructions, which, when executed, cause the computing device to: perform a preliminary digital image analysis on the first digital image, the preliminary digital image analysis identifying at least one of: the first object or the first pivot point; and generate the first set of coordinates based on the preliminary image analysis.

A fourteenth example is a method of improving computer detection of a second object in a physical scene, the method comprising: obtaining, at a computing device, a first digital image of a physical scene; obtaining, at the computing device, a first set of coordinates within the first digital image, the first set of coordinates identifying at least one of: a first image area corresponding to a first object in the physical scene or a first image point corresponding to a first pivot point in the physical scene to which the first object is pivotably coupled; identifying, by the computing device, a second image area relevant to a second object to be detected in the first digital image based on the first set of coordinates, the second image area being only a portion of the first digital image; performing, by the computing device, digital image analysis on only the second image area, to the exclusion of other areas of the first digital image, the digital image analysis identifying a first set of pixels of the second image area and a first confidence that the first set of pixels are of the second object in the physical scene; and generating, by the computing device, an indication that the second object was detected by the computing device in the physical scene if the first confidence is greater than a threshold confidence level.

A fifteenth example is the method device of the fourteenth example, wherein the obtaining the first set of coordinates comprises obtaining, with the first set of coordinates, an identification of at least one of: which body part of a first human or which joint of a first human is delineated by the first set of coordinates, the first human being in the physical scene; and wherein the identifying the second image area relevant to the second object comprises identifying the second image area based on which body part of the first human or which joint of the first human is delineated by the first set of coordinates.

A sixteenth example is the method of the fourteenth example, further comprising: determining, by the computing device, a pose of a first human in the physical scene based on the first digital image.

A seventeenth example is the method of the sixteenth example, further comprising: modifying, by the computing device, the threshold confidence level based on the determined pose of the first human in the physical scene.

An eighteenth example is the method of the fourteenth example, further comprising: performing, by the computing device, a preliminary digital image analysis on the first digital image, the preliminary digital image analysis identifying at least one of: the first object or the first pivot point; and generating, by the computing device, the first set of coordinates based on the preliminary image analysis.

A nineteenth example is a system comprising: a first computing device comprising: a first computing device processing unit; and a first computing device computer-readable media comprising computer-executable instructions, which, when executed by the first computing device processing unit, cause the first computing device to: obtain a first digital image of a physical scene; obtain a first set of coordinates within the first digital image, the first set of coordinates identifying at least one of: a first image area corresponding to a first object in the physical scene or a first image point corresponding to a first pivot point in the physical scene to which the first object is pivotably coupled; identify a second image area relevant to a second object to be detected in the first digital image based on the first set of coordinates, the second image area being only a portion of the first digital image; and transmit only the second image area, to the exclusion of other areas of the first digital image; and a second computing device comprising: a second computing device processing unit; and a second computing device computer-readable media comprising computer-executable instructions, which, when executed by the second computing device processing unit, cause the second computing device to: receive the second image area from the first computing device; perform digital image analysis on the second image area, the digital image analysis identifying a first set of pixels of the second image area and a first confidence that the first set of pixels are of the second object in the physical scene; and generating an indication that the second object was detected in the physical scene if the first confidence is greater than a threshold confidence level.

A twentieth example is the system of the nineteenth example, further comprising: a third computing device comprising: a third computing device processing unit; and a third computing device computer-readable media comprising computer-executable instructions, which, when executed by the third computing device processing unit, cause the third computing device to: perform a preliminary digital image analysis on the first digital image, the preliminary digital image analysis identifying at least one of: the first object or the first pivot point; and generate the first set of coordinates based on the preliminary digital image analysis; wherein the first computing device obtains the first set of coordinates from the third computing device.

As can be seen from the above descriptions, mechanisms for implementing a focused computer detection of objects in images have been presented. In view of the many possible variations of the subject matter described herein, we claim as our invention all such embodiments as may come within the scope of the following claims and equivalents thereto.

We claim:

1. A computing device, comprising:
one or more processing units; and
memory holding instructions to identify an object in a digital image of a physical scene, the instructions comprising:
instructions to obtain the digital image of the physical scene;
instructions to obtain a set of coordinates within the digital image, the set of coordinates identifying at least one of: a first image area corresponding to a body part of a human in the physical scene or an image point corresponding to a pivot point of a joint of the human in the physical scene to which the body part is pivotably coupled;
instructions to determine a pose of the human in the physical scene based on the digital image;
instructions to identify a second image area corresponding to an object to be detected in the digital image based on the set of coordinates, the second image area being only a portion of the digital image;
instructions to perform digital image analysis on only the second image area, to the exclusion of other areas of the digital image, the digital image analysis identifying a set of pixels of the second image area and a confidence that the set of pixels are of the object in the physical scene; and
instructions to generate an indication that the object was detected in the physical scene if the confidence is greater than a threshold confidence level that is set based on the determined pose of the human in the physical scene.

2. The computing device of claim 1, wherein the instructions to identify the second image area corresponding to the object comprise instructions to identify the second image area as surrounding the first image area.

3. The computing device of claim 1, wherein the instructions to identify the second image area corresponding to the object comprise instructions to identify the second image area as adjacent to the image point.

4. The computing device of claim 1, wherein the instructions further comprise instructions to perform a subsequent digital image analysis on the other areas of the digital image, the subsequent digital image analysis identifying a second set of pixels of the other areas of the digital image and a second confidence that the second set of pixels are of the object in the physical scene.

5. The computing device of claim 1, wherein the instructions to obtain the set of coordinates comprise instructions to obtain, with the set of coordinates, an identification of at least one of: which body part of the human or which joint of the human is delineated by the set of coordinates; and
wherein the instructions to identify the second image area corresponding to the object comprise instructions to identify the second image area based on which body part of the human or which joint of the human is delineated by the set of coordinates.

6. The computing device of claim 5, wherein the instructions to identify the second image area corresponding to the object comprise instructions to estimate a third image area corresponding to a hand of the human within the physical scene; and
instructions to identify the second image area as surrounding the third image area to detect the object being carried by the human within the physical scene.

7. The computing device of claim 1, wherein the instructions to determine the pose comprise instructions to determine the pose of the human in the physical scene based on the digital image and the set of coordinates.

8. The computing device of claim 1, wherein the instructions further comprise instructions to modify the second image area based on the determined pose of the human in the physical scene; and
 wherein the instructions to perform the digital image analysis on only the second image area comprise instructions to perform the digital image analysis on only the modified second image area.

9. The computing device of claim 1, wherein the instructions to modify the threshold confidence level comprise instructions to decrease the threshold confidence level when the determined pose of the human in the physical scene is a pose of a human utilizing an object of a same type as the object.

10. The computing device of claim 1, wherein the instructions further comprise instructions to perform a preliminary digital image analysis on the digital image, the preliminary digital image analysis identifying at least one of: the body part of the human or the pivot point of the joint of the human; and
 instructions to generate the set of coordinates based on the preliminary digital image analysis.

11. A computer-implemented method of detecting an object in a digital image of a physical scene, the method comprising:
 obtaining, at a computing device, the digital image of the physical scene;
 obtaining, at the computing device, a set of coordinates within the digital image, the set of coordinates identifying at least one of: a first image area corresponding to a body part of a human in the physical scene or a image point corresponding to a pivot point of a joint of the human in the physical scene to which the body part is pivotably coupled;
 estimating, at the computing device, a second image area within the digital image corresponding to a hand of the human in the physical scene based on the set of coordinates and which body part of the human or which joint of the human is delineated by the set of coordinates;
 identifying, by the computing device, a third image area within the digital image surrounding the second image area corresponding to the hand of the human in the physical scene, the third image area corresponding to the object being held in the hand of the human in the physical scene, the third image area being only a portion of the digital image;
 performing, by the computing device, digital image analysis on only the third image area, to the exclusion of other areas of the digital image, the digital image analysis identifying a set of pixels of the third image area and a confidence that the set of pixels are of the object in the physical scene; and
 generating, by the computing device, an indication that the object was detected by the computing device in the physical scene if the confidence is greater than a threshold confidence level.

12. The method of claim 11, wherein the obtaining the set of coordinates comprises obtaining, with the set of coordinates, an identification of at least one of: which body part of the human or which joint of the human is delineated by the set of coordinates, the human being in the physical scene; and
 wherein identifying the second image area corresponding to the object comprises identifying the second image area based on which body part of the human or which joint of the human is delineated by the set of coordinates.

13. The method of claim 11, further comprising:
 determining, by the computing device, a pose of the human in the physical scene based on the digital image.

14. The method of claim 13, further comprising:
 modifying, by the computing device, the threshold confidence level based on the determined pose of the human in the physical scene.

15. The method of claim 11, further comprising:
 performing, by the computing device, a preliminary digital image analysis on the digital image, the preliminary digital image analysis identifying at least one of: the body part of the human in the physical scene or the pivot point of the joint of the human in the physical scene; and
 generating, by the computing device, the set of coordinates based on the preliminary digital image analysis.

16. A computer-implemented method of identifying an object in a digital image of a physical scene, the computer-implemented method comprising:
 obtaining the digital image of the physical scene;
 obtaining a set of coordinates within the digital image, the set of coordinates identifying at least one of: a first image area corresponding to a body part of a human in the physical scene or an image point corresponding to a pivot point of a joint of the human in the physical scene to which the body part is pivotably coupled;
 determining a pose of the human in the physical scene based on the digital image;
 identifying a second image area corresponding to an object to be detected in the digital image based on the set of coordinates, the second image area being only a portion of the digital image;
 performing digital image analysis on only the second image area, to the exclusion of other areas of the digital image, the digital image analysis identifying a set of pixels of the second image area and a confidence that the set of pixels are of the object in the physical scene; and
 generating an indication that the object was detected in the physical scene if the confidence is greater than a threshold confidence level that is set based on the determined pose of the human in the physical scene.

17. The computer-implemented method of claim 16, wherein identifying the second image area corresponding to the object comprises identifying the second image area as surrounding the first image area.

* * * * *